United States Patent [19]

Ross

[11] 4,084,301
[45] Apr. 18, 1978

[54] TROLLEY RAIL ASSEMBLY
[75] Inventor: Donald R. Ross, Pittsburgh, Pa.
[73] Assignee: U-S Safety Trolley Corporation, Pittsburgh, Pa.
[21] Appl. No.: 798,302
[22] Filed: May 19, 1977
[51] Int. Cl.² .............................................. B23P 23/04
[52] U.S. Cl. .................................. 29/33 K; 29/33 S; 29/819
[58] Field of Search ................... 29/33 K, 33 R, 33 S, 29/433, 819

[56] References Cited
U.S. PATENT DOCUMENTS 3,689,982  9/1972  Campbell ........................... 29/433 X
3,942,238  3/1976  Dore ..................................... 29/433

Primary Examiner—Frank T. Yost
Attorney, Agent, or Firm—Brown, Murray, Flick & Peckham

[57] ABSTRACT

Apparatus is supported by one end of a line of rails for feeding metal bars from a coil lengthwise into parallel longitudinal slots in the rails to form continuous straight electrical conductors. The feeding apparatus includes a plurality of staggered straightening rolls for straightening the conductor bar as it is pulled from the reel for feeding it into the slot in line with the apparatus, the apparatus being adjustable transversely of the rails to locate it in line with the different slots.

5 Claims, 4 Drawing Figures

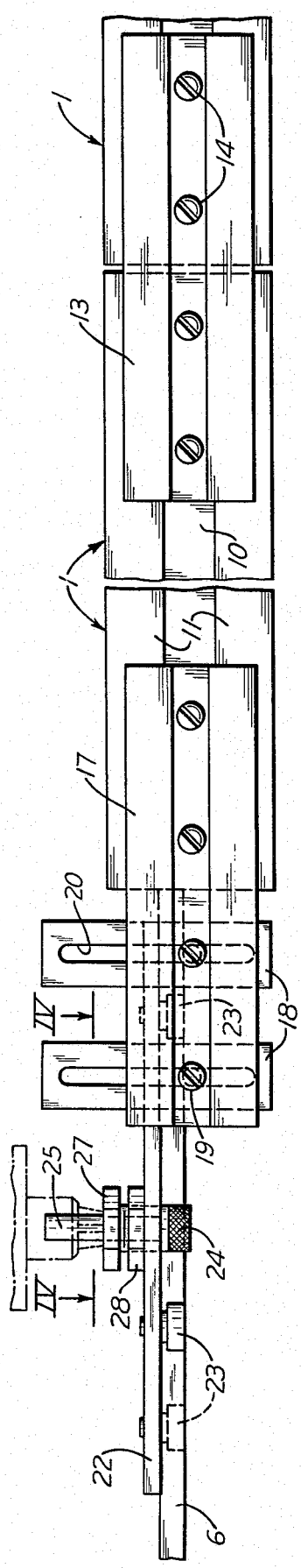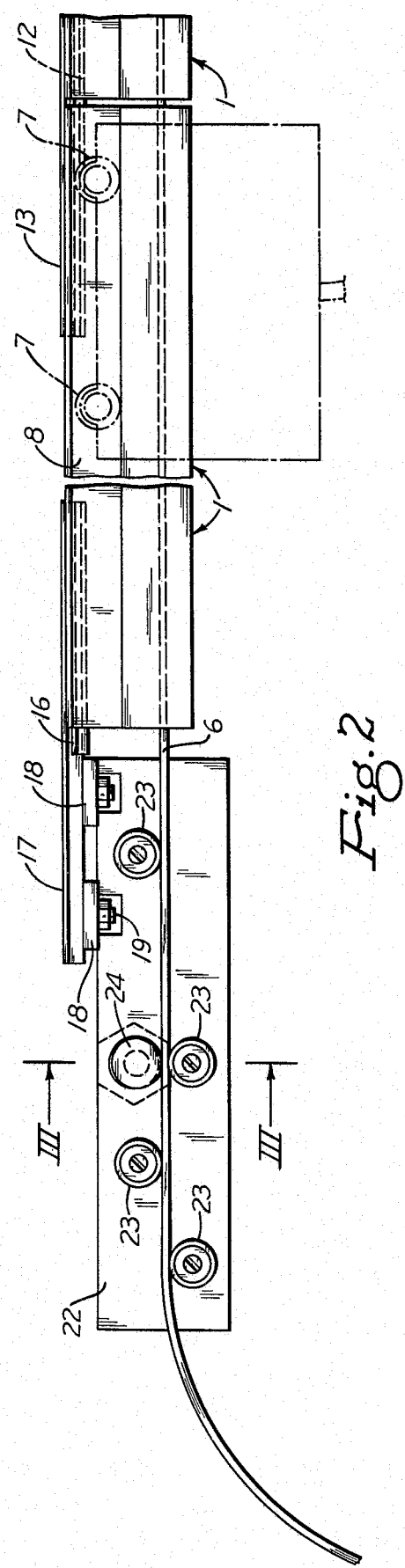

4,084,301

TROLLEY RAIL ASSEMBLY

In U.S. Pat. No. 3,772,482, a trolley rail unit is shown that includes extrusions of insulating material in the form of rigid housings disposed end to end and having a lower or front side provided with parallel slots extending lengthwise of the housings for receiving electric current pick-up members that are movable lengthwise of the rail unit. Supported in the upper or inner ends of these slots are metal conductor bars that conduct electric current, which they supply to the pick-up members. There are several slots and a like number of pick-up members.

The extruded housings made in accordance with the patent are relatively short compared with the overall length of the system. For example, usually they are about twenty feet long, so that they must be connected end to end to obtain the desired length, which may be 300 feet or more. The electrical conductor bars are inserted in each rigid housing from one end of it, and since the bars are substantially the same length as the individual housings, the bars also must be connected end to end at the joints between the housings. In a long rail system this can mean a great many joints in the conductor bars, which obviously is undesirable. The joints require time and fasteners to connect the bars together and they are the major source of wear of the contact shoes of the pick-up members. On the other hand, it is quite difficult, and sometimes practically impossible, to insert long continuous bars lengthwise into the slots manually so that there will be no joints in the bars, especially when the bar material must be pulled off a reel and straightened before it can be pushed into a slot.

It is an object of this invention to provide a trolley rail assembly that includes means for straightening electrical conductor bars just before they are fed lengthwise into the rail slots. Another ojbect is to use such straightening means for mechanically feeding the bars into the slots rapidly, regardless of the length of the slots.

The preferred embodiment of the invention is illustrated in the accompanying drawings, in which FIG. 1 is a plan view;

FIG. 2 is a side view;

Figure 3:
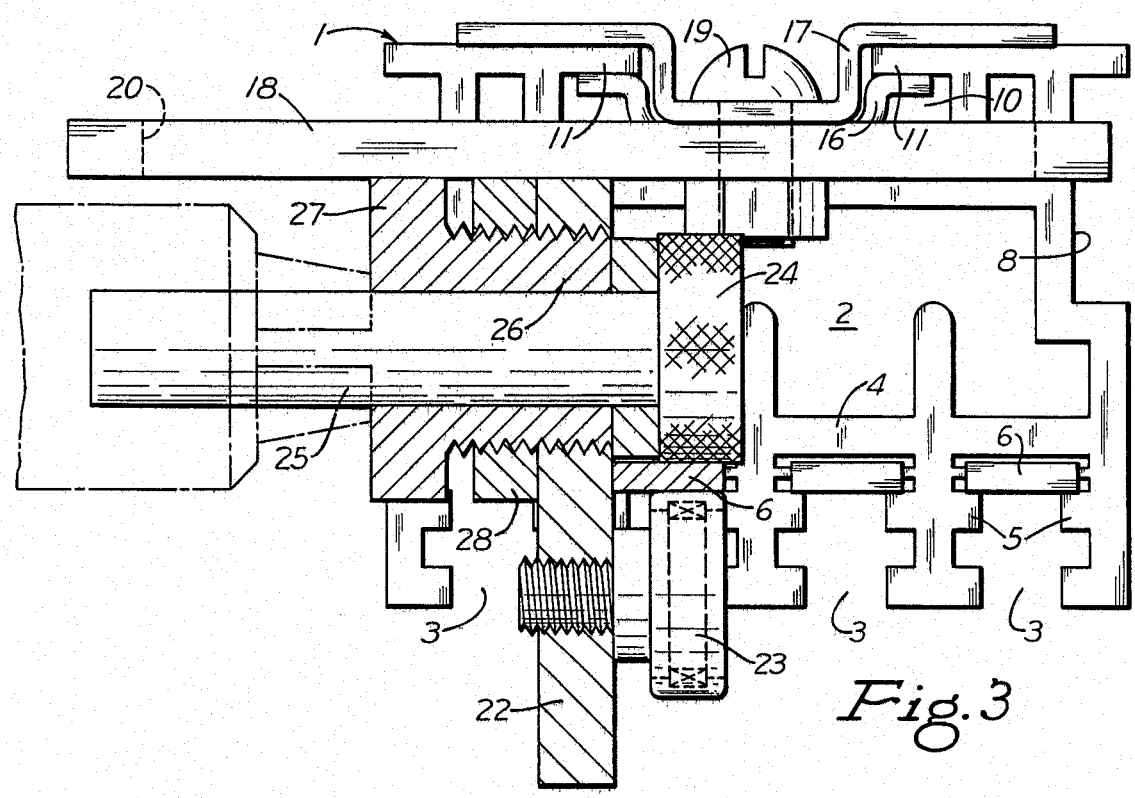
FIG. 3 is an enlarged cross section taken on the line III—III of FIG. 2.

Referring to the drawings, any desired number of rails 1 in the form of rigid housings, generally twenty feet long, are extruded from a suitable plastic, such as a high impact polyvinyl chloride, and disposed end to end. As shown in FIG. 3, each rail or housing preferably has a geneally rectangular outline in cross section and may be tubular to reduce its weight and to provide a duct 2 for wires and for other purposes. The tops or backs of the rails, dpending on whether they are installed as shown or on their sides, are rigidly connected to suitable supports (not shown). The opposite side of each rail, which is the bottom or front side, is provided with a plurality of parallel slots 3 extending lengthwise of it. The inner sides of the slots opposite their open sides are closed by a partition wall 4 that extends across them and forms the lower or front wall of the tubular portion of the rail.

Still referring to FIG. 3, extending along the opposite side walls of each slot is a pair of integral retaining ribs 5 that project toward each other. The space between the rear wall 4 of the slot and the ribs in front of it will accommodate a metal electrical conductor bar 6. The ribs hold the bar in place in opeative position, in which the bars are engaged by electric current pick-up members that extend into the slots. These members may be mounted on trolley arms or they may be supported by trolley wheels 7 that travel along the opposite side of the rail in channels 8 forming tracks for the wheels. In either case, the pick-up members carry contact shoes that slide along the bars and that are electrically connected to electrical conductors, by which current is carried away from them.

In order to connect the rails end to end, the back or top of the rail may be provided with a channel 10 extending lengthwise of it as shown in FIGS. 1 and 3. The outer edges of the side walls of the channel have flanges 11 extending toward each other a short distance. A rectangular plate 12 is slid into one end of a rail channel and then the adjacent end of the next rails is moved against the end of the first rail. The plate is moved along the two channels until it straddles the joint between the adjacent ends of the rails. Another plate 13 is placed against the back of the flanges 11, and screws 14 that are rotatably mounted in this plate are screwed into threaded holes in plate 12. By tightening the screws, the flanges of the two rails can be clamped between the two plates to connect the rails together. Preferably, the plates are provided with central longitudinal channels that nest together. If desired, the two plates can be connected together loosely before plate 12 is inserted in the rail channels and handled as a single unit.

It is a feature of this invention that apparatus is provided for inserting the conductor bars in the slots in the rail by feeding them from a coil lengthwise into those slots, with each bar extending continuously the full length of the line of rails so that there are no joints in the bar. Accordingly, two plates 16 and 17 like those used for connecting the rails, except that plate 16 is shorter, are clamped onto the rail at one end of the line to form a bracket. The shorter plate is about half as long as the other one and projects only a short distance, if at all, from the rail. The longer plate does project a few inches.

Figure 4:
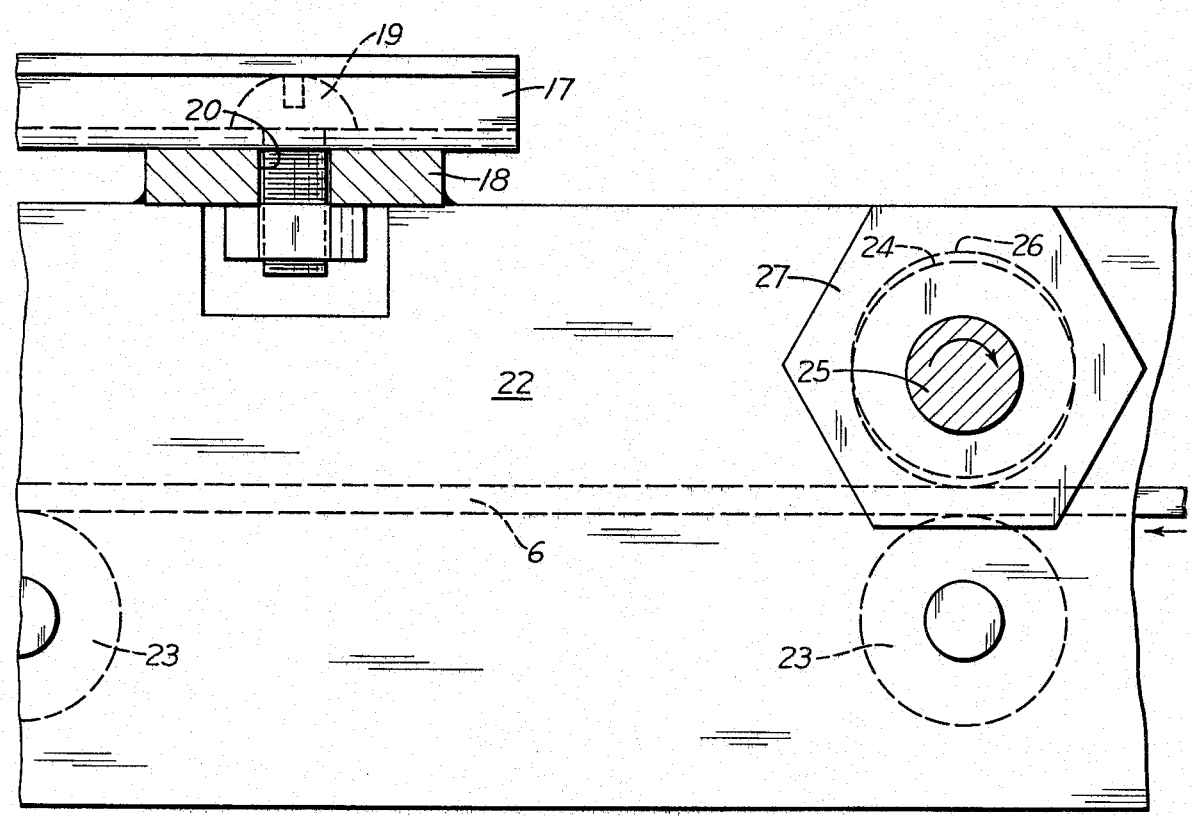
FIG. 4 is a fragmentary side view of section taken on the line IV—IV of FIG. 1.

The bracket supports a bar straightener. Thus, extending across the bottom of the bracket beyond the lower plate are two cross bars 18 held against the bracket by bolts 19 extending through longitudinal slots 20 in the bars. Rigidly secured to the bottom of these bars is the top of a vertical plate 22 that extends away from the rail, longitudinally thereof. Disposed at one side of this plate and rotatably mounted in it are an upper and lower row of straightening rolls 23. As shown in FIG. 2, the rolls in one row are staggered relative to those in the other row in the manner of a roller leveler. Spaced vertically from one of the rolls is a driving roll 24, preferably provided with a knurled surface. This roll is supported by a shaft 25 attached to it and extending through a bearing 26 in the plate as shown in FIG. 4. The outside of the bearing is threaded and is screwed into the plate. The threaded bearing extends away from the side of the plate opposite the rolls and has a wrench-receiving head 27 on its outer end so that it can be turned. The reason for turning it is the fact that the shaft-receiving opening through the bearing is slightly off-center, so that by turning the bearing the driving roll can be moved closer to or farther away from the roll opposite it, whereby to accommodate conductor bar material of different thicknesses.

When the bearing has been turned to the desired position, it is locked there by a lock nut 28 on the bearing between its head and the plate, the nut being tightened against the plate.

OPERATION

To a feed a conductor bar into a slot in the line of rails, bolts 19 are loosened to permit the cross bars 18 to be moved across the bracket until the roll pass through the straightener is in line with the desired slot. Then the bolts are tightened. The drawings show that two conductor bars have already been fed into the line of rails and that the straightener has been moved into position for feeding a bar into a third slot. With the straightener in position, the leading end of the bar then is pulled from a reel manually and pushed forward through the roll pass between the straightening rollers. This will straighten the bar so that its front end can be inserted in the end of the empty slot. Then power is applied to the driving roll shaft to feed the bar rapidly into the slot. A convenient source of power is an electric drill temporarily clamped onto the roll shaft instead of onto a drill bit. The mechanical drive for the bar has been found effective for straightening and feeding conductor bars into rail slots that are over 300 feet long.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In combination with a line of rails disposed end to end and having a front side provided with parallel slots extending lengthwise thereof for receiving electric current pick-up members movable lengthwise of the rails, apparatus for feeding metal bars from a coil lengthwise into said slots to form continuous straight electrical conductors in said rails, said apparatus comprising supporting means attached to one end of said line of rails and extending away from it, a roll support, means rigidly connecting the roll support to said supporting means at said end of said line, and a plurality of staggered straightening rolls rotatably mounted in said roll support to form a roll pass substantially in line with one of said slots, whereby a conductor bar fed through said roll pass will be straightened therein and directed into said one slot.

2. In the combination recited in claim 1, a power driving roll rotatably mounted in said roll support and tightly engaging the side of a conductor bar opposite one of said straightening rolls for feeding a conductor bar through said roll pass and into one of said slots.

3. In the combination recited in claim 2, a bearing for said driving roll rotatably mounted in said roll support and provided with an off-center cylindrical opening therethrough, a drive shaft rigidly connected to one end of said driving roll and journaled in said bearing opening, and means for locking said bearing in different angular positions in the roll support to permit the spacing between the driving roll and the opposed straightening roll to be varied.

4. In the combination recited in claim 1, said roll support being a plate extending lengthwise away from said line of rails, and said rolls all being located on one side of the plate.

5. In the combination recited in claim 1, said supporting means being a bracket extending lengthwise of said line of rails parallel to the common plane of said slots, and said connecting means being rigid means secured to said roll support and provided with slots extending transversely thereof, and bolts mounted in said bracket and extending through said last-mentioned slots for adjustably connecting said slotted adjusting means to said bracket.

* * * * *